(12) United States Patent
Wrightman

(10) Patent No.: US 9,091,059 B2
(45) Date of Patent: Jul. 28, 2015

(54) LOG BUILDING

(76) Inventor: Robert A. Wrightman, Bracebridge (CA)

( * ) Notice: Subject to any disclaimer, the term of this patent is extended or adjusted under 35 U.S.C. 154(b) by 1319 days.

(21) Appl. No.: 12/232,322

(22) Filed: Sep. 15, 2008

(65) Prior Publication Data

US 2009/0133345 A1    May 28, 2009

Related U.S. Application Data

(60) Provisional application No. 60/972,055, filed on Sep. 13, 2007.

(51) Int. Cl.
| | |
|---|---|
| F16B 13/00 | (2006.01) |
| F16B 17/00 | (2006.01) |
| E04B 2/70 | (2006.01) |
| F16B 39/28 | (2006.01) |
| E04B 1/41 | (2006.01) |
| E04B 1/10 | (2006.01) |
| F16B 39/04 | (2006.01) |
| E04B 1/35 | (2006.01) |

(52) U.S. Cl.
CPC .................. *E04B 2/702* (2013.01); *F16B 39/28* (2013.01); *E04B 1/10* (2013.10); *E04B 1/40* (2013.01); *E04B 2001/3583* (2013.01); *F16B 17/00* (2013.01); *F16B 39/04* (2013.01)

(58) Field of Classification Search
CPC ............ F16B 2/02; F16B 13/00; F16B 17/00; F16B 39/28; F16B 39/04; F16B 2/00; F16B 9/02; F16B 9/023; F16B 16/026; F16B 21/00; F16B 21/02

USPC .......... 52/223.7, 233, 741.1, 223.13, 223.14, 52/293.3; 411/332, 205
See application file for complete search history.

(56) References Cited

U.S. PATENT DOCUMENTS

| | | | | |
|---|---|---|---|---|
| 1,375,402 | A | * | 4/1921 | McAvoy et al. ............... 52/91.1 |
| 1,783,383 | A | * | 12/1930 | Montrief ..................... 52/293.2 |
| 2,669,060 | A | * | 2/1954 | Kalvig ......................... 446/123 |
| 3,212,466 | A | * | 10/1965 | Wintersteen ................. 266/214 |
| 3,690,204 | A | * | 9/1972 | Deakin et al. ................. 83/112 |
| 3,965,542 | A | * | 6/1976 | Gregory ..................... 24/136 R |
| 4,163,347 | A | * | 8/1979 | Marcmann ..................... 52/105 |
| 4,812,096 | A | * | 3/1989 | Peterson ..................... 411/231 |
| 4,928,531 | A | * | 5/1990 | Schult et al. ................... 73/855 |
| 4,974,888 | A | * | 12/1990 | Childers ..................... 292/251 |
| 4,979,649 | A | * | 12/1990 | Wescott ....................... 222/174 |
| 5,081,811 | A | * | 1/1992 | Sasaki ...................... 52/223.13 |
| 5,570,549 | A | * | 11/1996 | Lung et al. .................... 52/295 |
| 5,690,006 | A | * | 11/1997 | Pulliam ...................... 81/177.2 |
| 5,749,272 | A | * | 5/1998 | Phan ............................... 81/62 |
| 6,050,033 | A | | 4/2000 | Wrightman |
| 6,151,850 | A | * | 11/2000 | Sorkin ...................... 52/223.13 |

(Continued)

FOREIGN PATENT DOCUMENTS

| | | | | |
|---|---|---|---|---|
| CA | 1273468 | | 9/1990 | |
| GB | 2036847 | A * | 7/1980 | ............... E04B 5/43 |
| JP | 06200571 | A * | 7/1994 | ............... E04B 2/02 |

*Primary Examiner* — Phi A

(74) *Attorney, Agent, or Firm* — Blake, Cassels & Graydon LLP; John R. S. Orange

(57) ABSTRACT

A tie bolt assembly for a log building has a coil spring that applies a continuous compressive load to force the logs together. Subsequent expansion or separation of the logs is prevented by a ratchet mechanism acting between the tie bolt and log.

58 Claims, 8 Drawing Sheets

(56) References Cited

U.S. PATENT DOCUMENTS

| | | | |
|---|---|---|---|
| 6,195,949 B1* | 3/2001 | Schuyler | 52/223.13 |
| 6,385,929 B1* | 5/2002 | Englehart | 52/233 |
| 6,904,728 B2* | 6/2005 | Stutts | 52/233 |
| 6,915,614 B2* | 7/2005 | Matsufuji | 52/600 |
| 7,080,578 B2* | 7/2006 | Izumisawa | 81/57.39 |
| 7,117,647 B2* | 10/2006 | Clarke | 52/233 |
| 7,313,890 B2* | 1/2008 | Clarke | 52/233 |
| 7,340,867 B2* | 3/2008 | Espinosa | 52/578 |
| 7,561,936 B2* | 7/2009 | Matsufuji | 700/98 |
| 7,594,367 B2* | 9/2009 | Clarke | 52/233 |
| 7,594,370 B2* | 9/2009 | Clarke | 52/586.1 |
| 7,621,085 B2* | 11/2009 | Commins | 52/293.3 |
| 7,665,258 B2* | 2/2010 | Espinosa | 52/293.3 |
| 7,752,824 B2* | 7/2010 | Brown et al. | 52/745.21 |
| 7,905,066 B2* | 3/2011 | Pryor et al. | 52/223.14 |
| 8,186,924 B1* | 5/2012 | Espinosa | 411/536 |
| 2005/0257492 A1* | 11/2005 | Miller | 52/749.1 |
| 2008/0127583 A1 | 6/2008 | Wrightman et al. | |

* cited by examiner

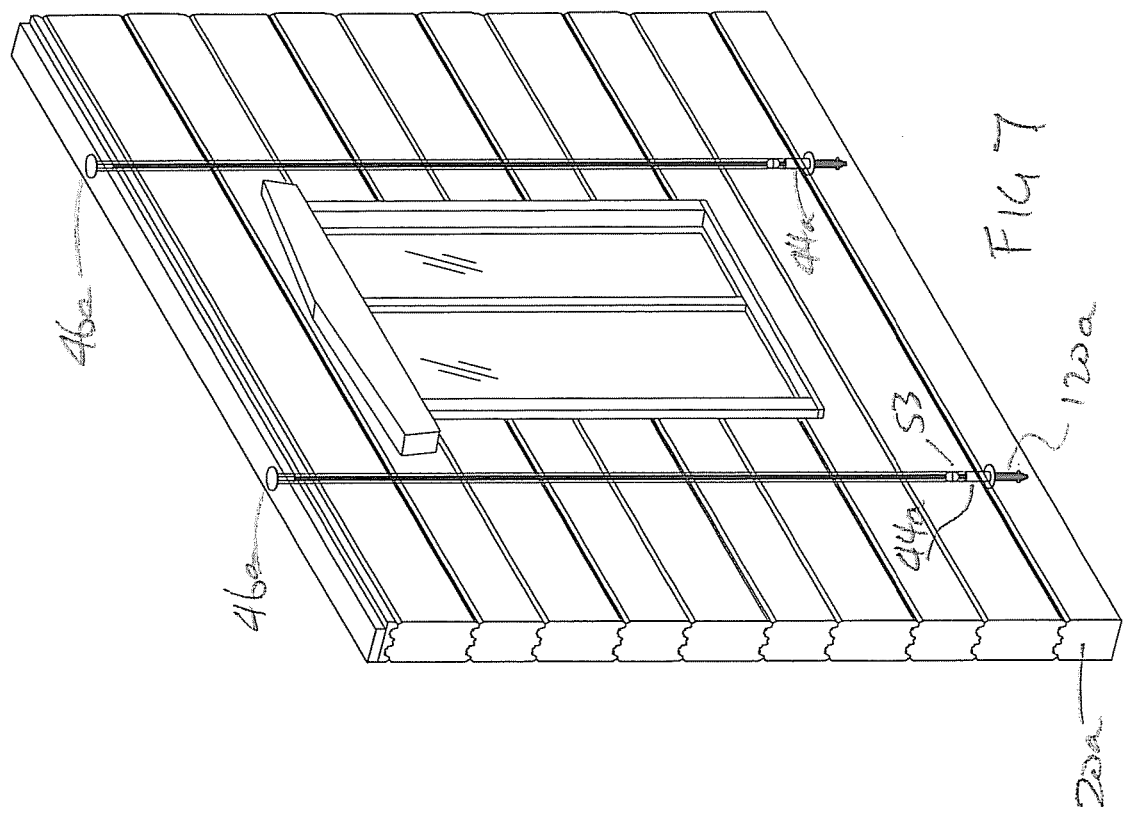

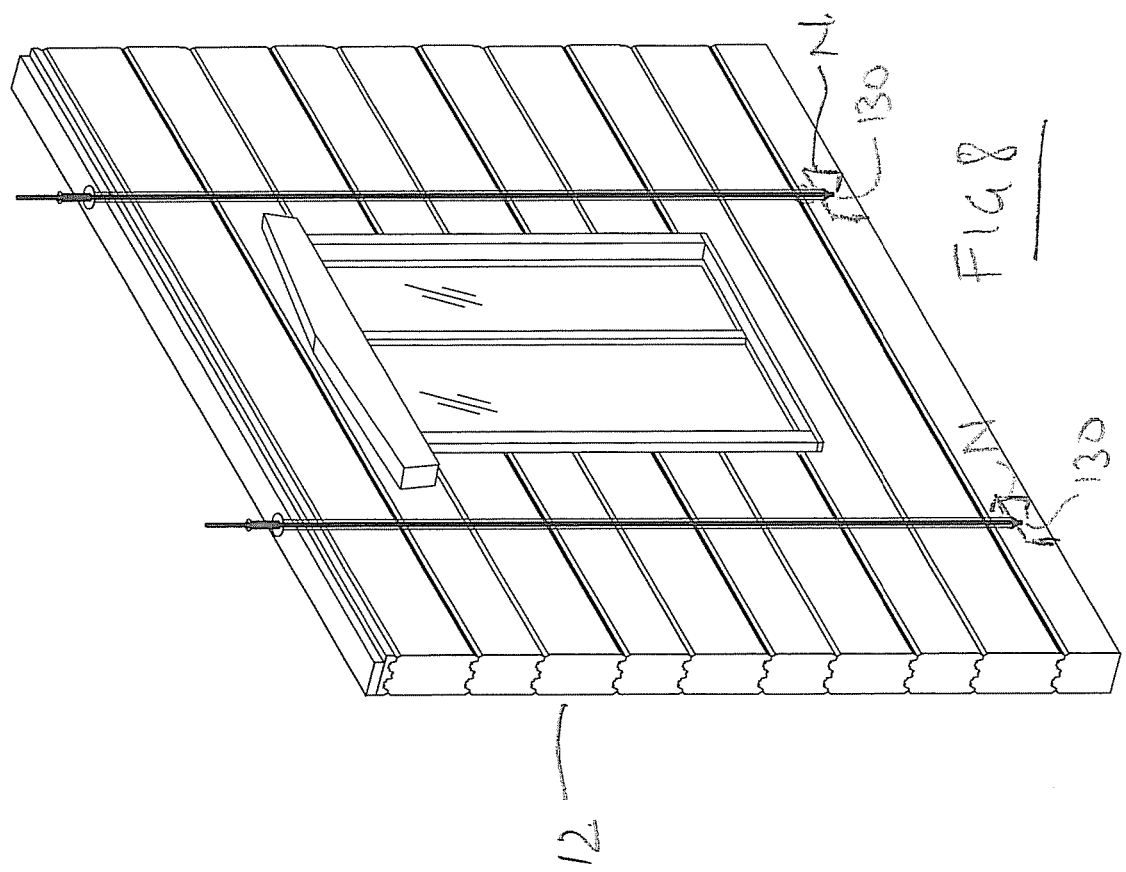

LOG BUILDING

CROSS REFERENCE TO RELATED APPLICATION

This application claims priority from U.S. Provisional Application No. 60/972,055 filed on Sep. 13, 2007 all of which are hereby incorporated by reference.

FIELD OF THE INVENTION

The present invention relates to log buildings.

DESCRIPTION OF THE PRIOR ART

It is well known to construct a building using horizontal logs as wall members. The logs are stacked one above the other to provide the vertically extending walls and may be interconnected at the corners of the building or where walls intersect. The interconnection may be through overlapping tenon joints or may be through the intermediary of a vertical post against which the end faces of the logs abut.

The logs themselves may be rough hewn and of varying cross section or may be machined to a constant cross section.

The abutting faces of the logs, whether rough hewn or machined, must be sealed to prevent ingress and/or egress of air. Traditionally, this is done with chinking, which is a malleable compound that may be placed between the upper and lower faces of the logs and deformed under the weight of the logs. The chinking is then wiped or finished to provide a smooth exterior surface. With machined logs, it is typical to incorporate inter-engaging tongues and grooves on upper and lower surfaces of the logs and to provide seals between the logs. The seals are typically in the form of a tape of asphalt impregnated foam or butyl rubber which is trapped between the logs at specific locations. The sealant tape has a limited compressibility to ensure that irregularities between the logs can be accommodated.

The logs are typically made from green lumber so they have significant moisture content when originally installed. As the logs dry, they shrink across the direction of the grain leading to an overall reduction in the height of each log. In ideal circumstances, the logs will shrink uniformly and the height of the walls of the building will decrease uniformly about the building. Practically, however, this rarely occurs and there is a difference in the shrinkage rate between logs and even within a particular log in a wall. The sealing material between the logs accommodates variations in the shrinkage but if the shrinkage is too great, a gap may occur between the logs. This requires resealing in the case of hand hewn logs or rectification in the case of machine logs.

To ensure an initial compression of the sealant between the logs, it is known to insert a vertical bar through the logs from top to bottom of the wall at spaced intervals. The bar is threaded and is secured with nuts and washers at opposite ends. After initial installation, the bar is tensioned by tightening of the nuts on the bars which forces the logs toward one another and ensures proper compression of the seal. To gain access to the nuts, notches are typically cut in the interior face of the lowermost log and access to the upper bolt is obtained above the top plate of the wall. This arrangement provides initial compression and settling of the logs but does not accommodate the shrinkage that occurs as the logs dry. Once the logs have shrunk more than the initial elongation of the bar due to the tensioning, the tension in the bar is relieved and does not contribute further to maintaining the logs in close contact.

It is known to provide a compression spring between the nut and the top plate of the upper most log so that the spring is compressed when the nut is initially tightened. Such an arrangement is shown, for example, in U.S. Pat. No. 6,904,728. With this arrangement, as the logs shrink, the spring expands and maintains a substantial tension within the rod to bias the logs towards one another.

Whilst this arrangement provides a continuing tension in the rod, it does not inhibit relative movement between the logs due to forces sufficient to overcome the spring. Such forces can occur where the logs have inherent residual stresses. The stresses may be induced, for example, by exposure to a prevailing wind or to the orientation of the log relative to the path of the sun. As the log dries, the inherent stresses attempt to deform the log and cause it to bow along its length. Such forces are significant and the downward force provided by the spring is insufficient to resist these forces. Accordingly, the provision of a simple spring does not maintain the integrity of the wall in typical situations.

U.S. Pat. No. 5,081,811 to Sasaki shows an arrangement in which accommodation is made for relative downward movement between the logs. In the Sasaki patent, the threaded bolt is secured to the upper log so that it moves with that log. The lower end of the bolt passes into a collet arrangement with the intention that as the logs shrink, the bolt moves downwardly relative to the lower log and the effective length of the bolt is adjusted. Reverse movement is prohibited due to the action of the collets. In theory, this arrangement would inhibit separation of the logs but in practice, there is no continuing control over the relative movement between the logs. The arrangement in Sasaki relies upon the uniform vertical movement of the logs as they dry. It will be appreciated that with Sasaki there is no tension induced in the bolt after the initial preload since all tension is relieved as the logs initially dry out. This lack of continuing tension within the bolt enables logs to "stick" in their vertical movement and introduce gaps between adjacent logs. Moreover, progressive cupping of the logs due to the inherent stresses will not be controlled, allowing the gaps between the logs to open up along the length of the log.

There is therefore the need for an improved arrangement in which control of relative movement between the logs is obtained.

SUMMARY OF THE INVENTION

According to the present invention, there is provided a log wall having a plurality of logs stacked one above another, a tie bolt extending through said logs between a pair of fastenings, a spring acting between one of said fastenings and a log to induce tension in said tie bolt, said one of said fastenings having a ratchet included therein to permit passage of the tie bolt against the bias of said spring and inhibit movement of said tie bolt under the bias of the spring.

BRIEF DESCRIPTION OF THE DRAWINGS

Embodiments of the invention will now be described by way of example only with reference to accompanying drawings in which:

FIG. 7 is a view similar to FIG. 3 showing an alternative embodiment of wall.

FIG. 8 is a view similar to FIG. 3 of a further embodiment of wall.

DETAILED DESCRIPTION OF THE INVENTION

Figure 1:
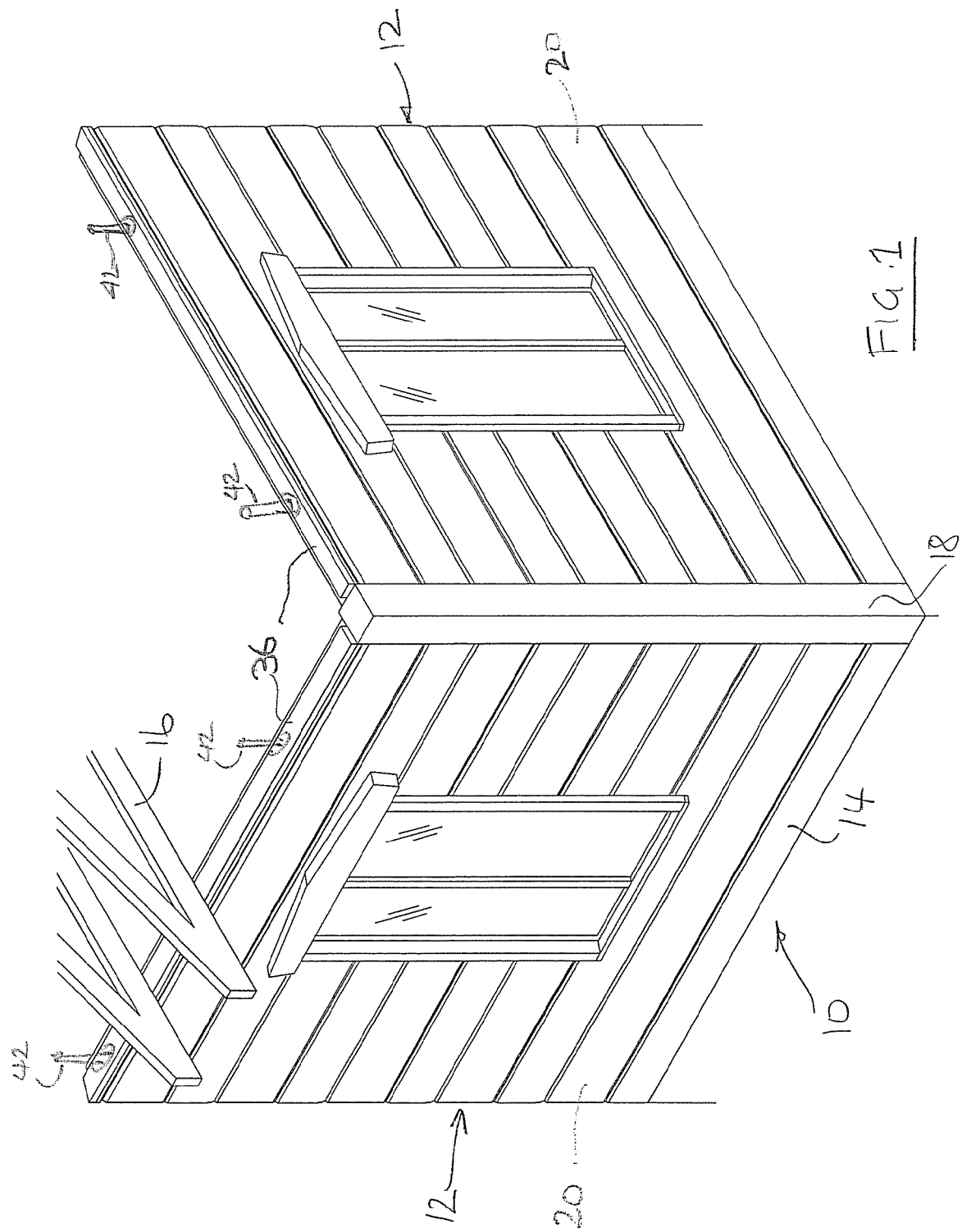
FIG. 1 is a perspective view of a log building.

Referring therefore to FIG. 1, a log building generally indicated at 10 includes log walls 12 supported on a foundation 14 and carrying a roof structure 16. The walls 12 intersect at corners 18 and are interconnected either by overlapping joints or by the provision of a post and a butt joint. The various ways in which the corners 18 may be formed is well known in the log building art and need not be described in further detail. A particular beneficial form of corner structure is shown in US Patent Application filed Aug. 28, 2007 titled "Log Wall Connector System", the contents of which are incorporated herein by reference. It will also be appreciated that whereas external walls are shown in FIG. 1, the preferred embodiment may also be used on internal walls.

Figure 2:
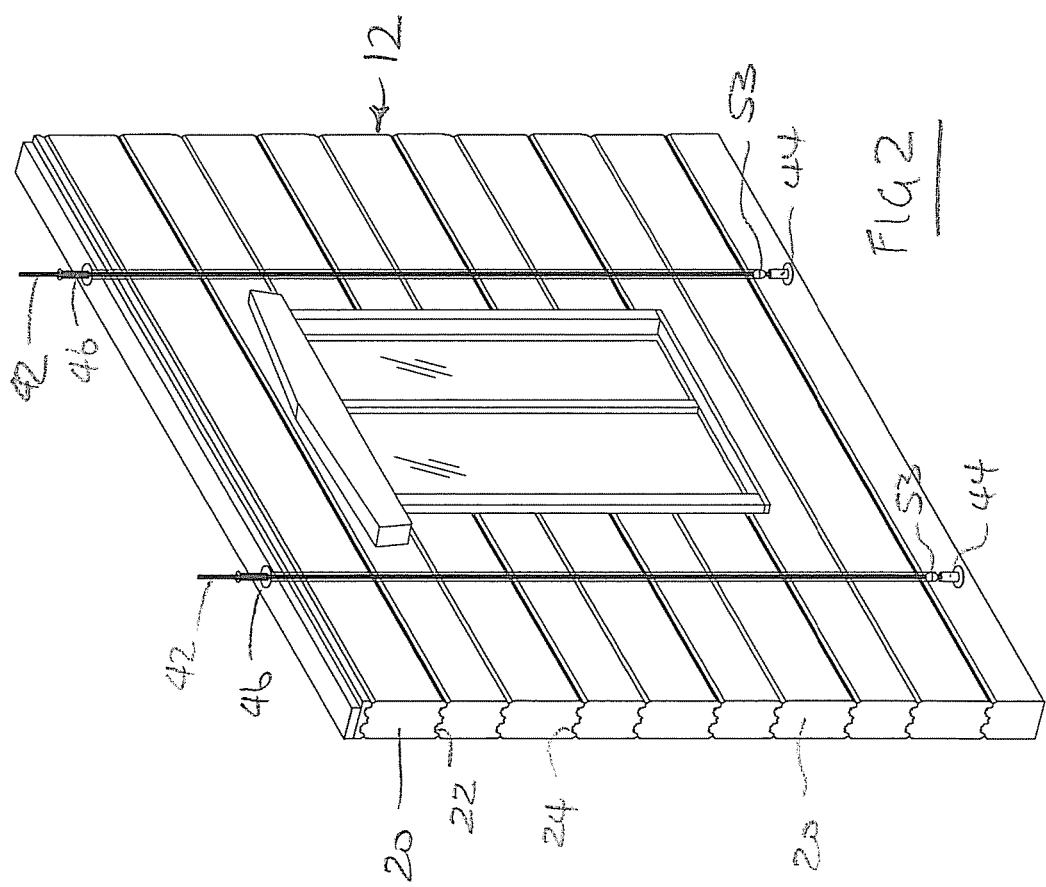
FIG. 2 is a section of a log wall of the building of FIG. 1.
Figure 3:
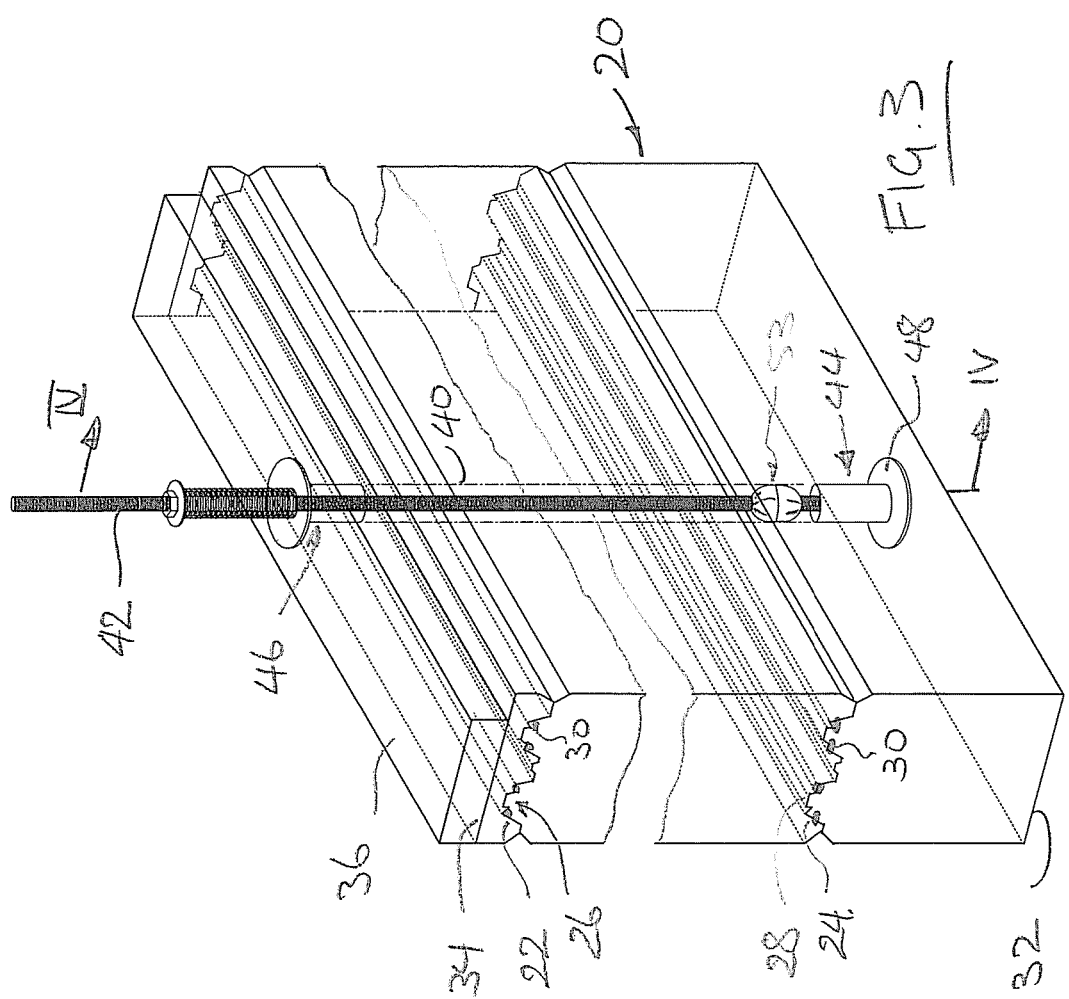
FIG. 3 is an enlarged view of the portion of the log wall section shown in FIG. 2.

Referring to FIG. 2, each of the log walls 12 is formed from logs 20 having abutting upper and lower faces 22, 24 respectively. As shown in FIG. 3, the upper and lower faces 22, 24 are formed with inter-engaging tongue and groove formations 26, 28 which in turn accommodate seals 30. The particulars of the tongue and groove formations 26, 28 are again well known in the art with many variations. A particularly beneficial tongue and groove formation is shown in Canadian Patent 1,273,468, and in US Patent Application filed Aug. 28, 2007 entitled "Log for Log Home" claiming priority U.S. Patent Application 60/840,614, the contents of which are incorporated herein by reference.

The seals 30 are formed from foam strips impregnated with asphalt and the tongue and groove formations 26, 28 are configured to provide limited compressibility of the foam strips when the upper face 22 and lower face 24 abut. Typically, the compression of the seals 30 is in the order of 30% of the free body dimension of the seal 30 to provide an effective sealing function between the upper face 22 and lower face 24.

The lower most log 20 has a planar lower face 32 that sits on foundation 14. The upper most log 20 similarly is formed with a planar upper face 34 and may have a top plate 36 extending along the planar upper face 34.

A hole 40 is drilled through the logs 20 at defined intervals and extends from the top plate 36 through each of the logs 20 to the planar lower face 32. Typically, the holes 40 are arranged at no greater than six foot centres along the walls 12 of the building and may be located closer than six feet to either side of openings that accommodate windows and doors. The hole 40 typically has a diameter in the order of 1¼ inches with the thickness of the logs 20 being between 6 and 12 inches. In some circumstances, the holes 40 may be drilled once the logs are in situ but typically are drilled prior to installation of the logs 20, particularly where factory machined logs are provided.

A tie bolt 42 extends through the hole 40 between a bottom fastening 44 and a top fastening 46 that locate the tie bolt at spaced locations relative to the wall 12. For convenience, the outer surface of the tie bolt 42 is threaded along its length although other configurations of tie bolts 42 may be used depending on the form of fastening 44, 46. The bottom fastening 44 is located within the hole 40 on the lower log 20 and has a radial flange 48 accommodated in a counter bore 50 (FIG. 4) in the planar lower face 32. Similarly, the top fastening 46 has a radial flange 52 (FIG. 6) that sits on the top plate 36.

A chip deflector 53 is located in the hole 40 adjacent the bottom fastening 44 with the tie bolt 42 passing through the deflector 53. The deflector 53 has a hollow body 54 with oppositely directed convex faces 55. A series of slits 56 radiate from the centre of the faces 55 to define flexible fingers 57 that engage the outer surface of the tie bolt 42. The body 54 is a snug fit within the hole 40 and is formed from a flexible plastics material that has sufficient resilience to allow the tie bolt 42 to pass between the fingers 57 but at the same time wipe the outer surface of the tie bolt 42. The fingers 57 act to remove any debris from the surface of the tie bolt 42, such as wood chips that remain in the hole 40 after drilling, and might impede the operation of the bottom fastening 44.

Figure 4:
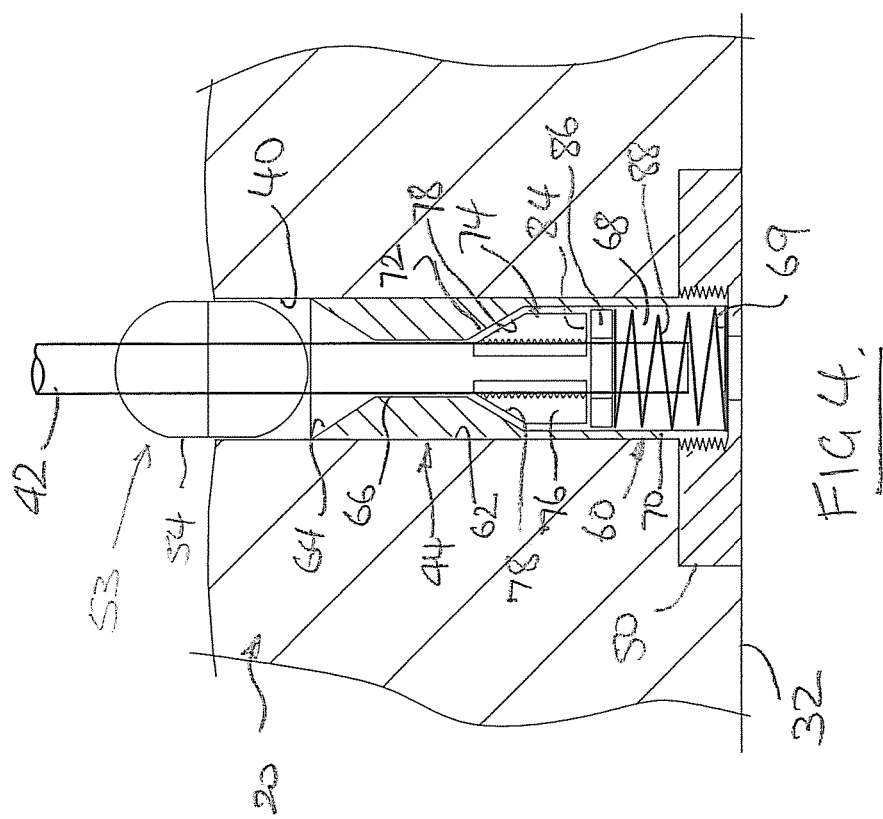
FIG. 4 is a section on the line IV-IV of FIG. 3.
Figure 5:
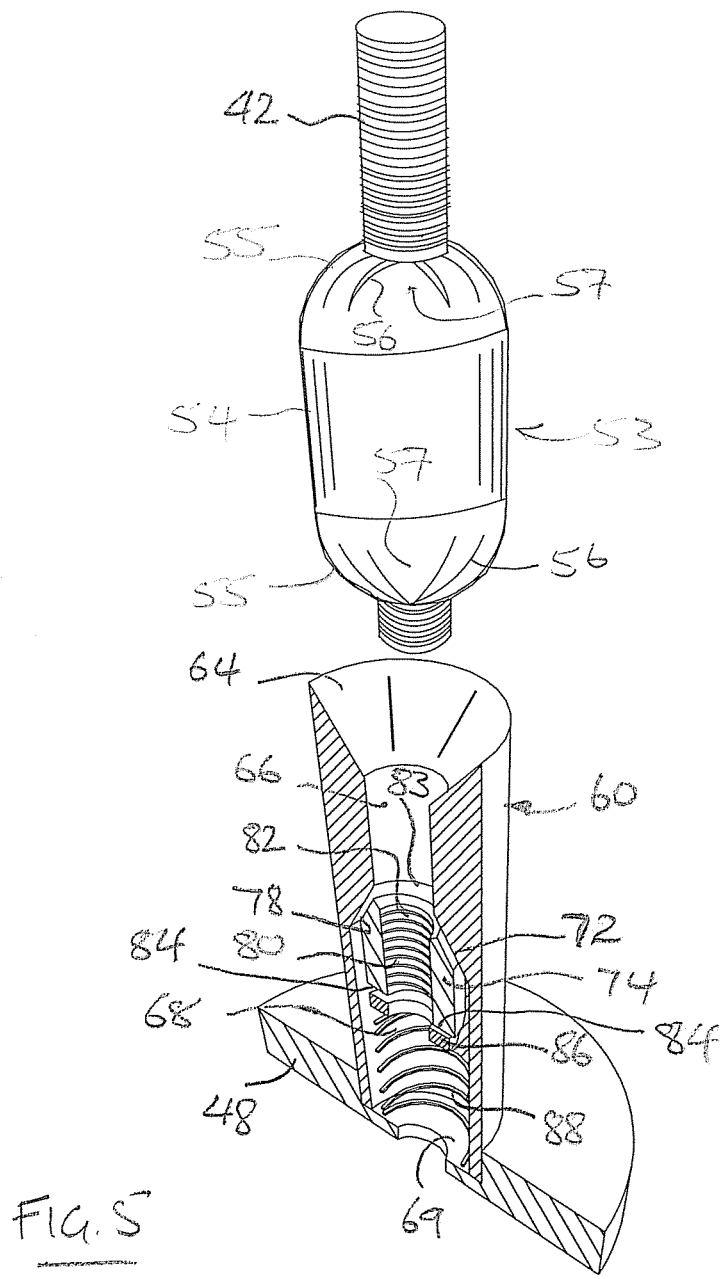
FIG. 5 is a perspective sectional view of FIG. 4.

The details of the bottom fastening 44 is best seen in FIGS. 4 and 5. The bottom fastening 44 has a tubular body 60 extending from the radial flange 48. The outer surface 62 of the tubular body 60 is dimensioned to be a sliding fit within the hole 40 and has, at its upper end, an inclined throat 64 leading to an inner bore 66. The inner bore 66 extends from the inclined throat 64 to a chamber 68 having a diameter greater than that of the inner bore 66. The chamber 68 has cylindrical sidewalls 70 that are connected to the inner bore 66 by a conical surface 72 and closed by an end wall 69 that extends inwardly from the radial flange 48.

A jaw assembly 74 is formed from a pair of collets 76, each of which has a conical surface 78 generally conforming to the conical surface 72. The collet 76 has a part cylindrical recess 80 that has teeth 82 formed on the inner surface of the part cylindrical recess 80. It will be appreciated that the teeth 82 are typically provided by a thread form complementary to the thread of the tie bolt 42. The recess 80 is connected to the conical surface 72 by an inclined face 83 that leads the tie bolt 42 into the jaw assembly 74 and promotes spreading of the collets 76.

Each of the collets 76 has an end face 84 against which a retainer washer 86 abuts. The retainer washer 86 is biased into engagement with the end face 84 by a spring 88 that bears against the end wall 69 of chamber 68 provided by an extension of the radial flange 48. The spring 88 acts to bias the collet 76 into engagement with the conical surface 78 and thereby minimize the lateral spacing between the collets 76.

The inner bore 66 has a diameter that is a clearance fit on the tie bolt 42 and the part cylindrical recess 80 similarly has a curvature that corresponds to the radius of the tie bolt 42. As such, with a tie bolt 42 inserted through the inner bore 66, the teeth 82 in part cylindrical recess 80 of each of the collets 76 engages the surface of the tie bolt 42 to grip the tie bolt 42 in the jaw assembly 74. Upward tension applied to the tie bolt 42 moves the conical surface 78 of the collets 76 into engagement with the conical surface 72 so that the teeth 82 securely engage the tie bolt 42.

Figure 6:
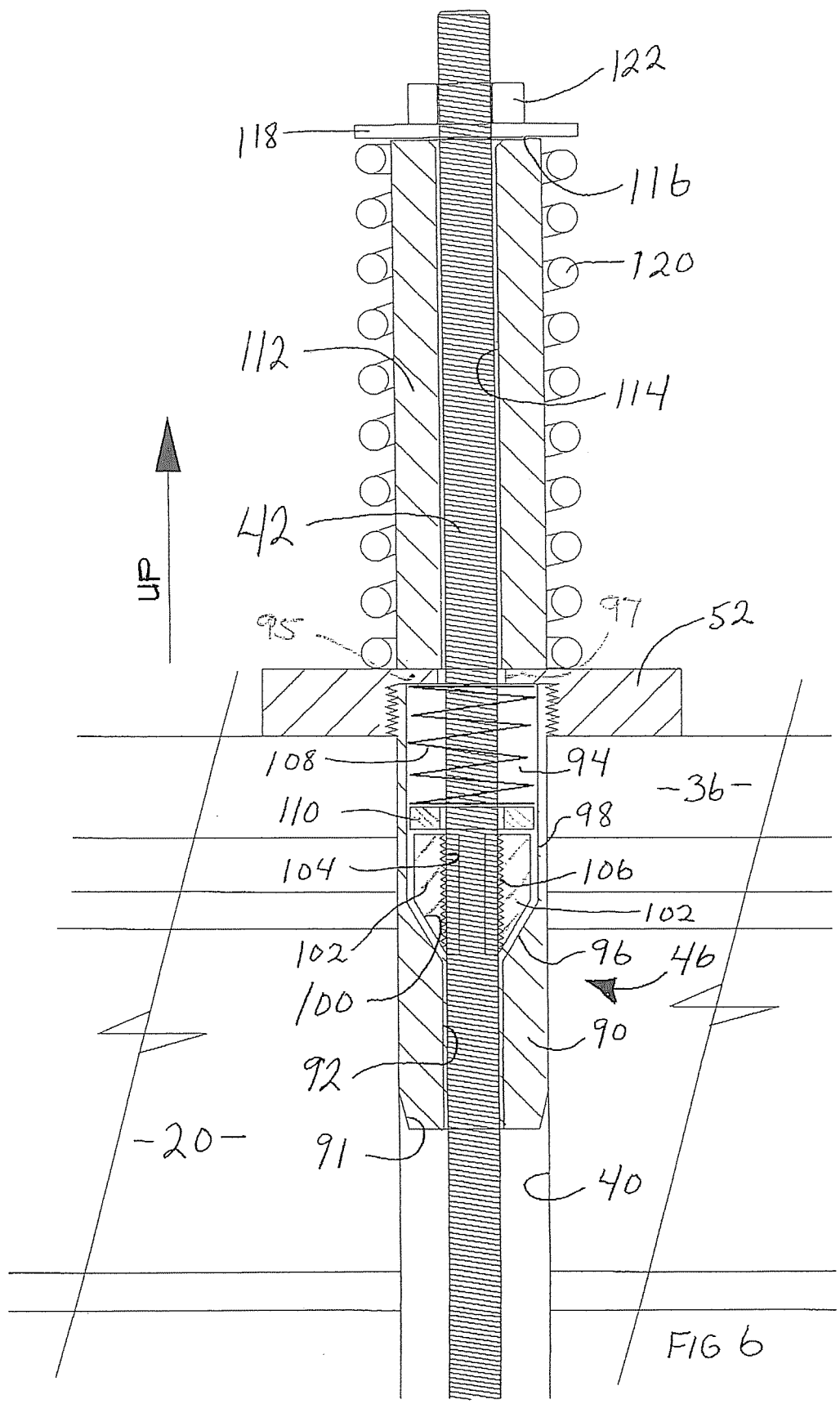
FIG. 6 is a view on the line VI-VI of FIG. 3.

A similar arrangement is provided on the top fastening 46 shown in FIG. 6. A tubular body 90 is secured to the radial flange 52 and projects into the hole 40. The tubular body 90 has a tapered leading edge 91 to facilitate entry into the hole 40 and has an inner bore 92 that opens into a chamber 94. The chamber 94 has a conical surface 96 extending between cylindrical side walls 98 and the inner bore 92 to receive conical surface 100 formed on each of a pair of collets 102. The collets 102 have teeth 104 formed on the part cylindrical recess 106 to engage tie bolt 42 extending through the top fastening 46. A spring 108 acts against a retainer washer 110 to bias the collets 102 into engagement with the conical surface 96. An end face 95 of the chamber is formed by an extension of the radial flange 52 and has an aperture 97 to allow the tie bolt 42 to pass through.

A tubular spacer 112 extends to the opposite side of the radial flange 52 to the tubular body 90. The tubular spacer 112 has an inner bore 114 that is a clearance fit around the tie bolt 42. The tubular spacer 112 may be secured to the radial flange 52 or may be free floating if preferred. The tubular body 112 has an end face 116 and a spring retainer plate 118 sits on the end face 116. A coil spring 120 extends around the tubular spacer 112 and bears, at one end, against the radial flange 52 and, at the opposite end against the spring retainer plate 118. The free body length of the coil spring 120 is greater than that of the tubular spacer 112 so that engagement of the spring retainer plate 118 against the end face 116 of the tubular spacer 112 compresses the coil spring 120 to a predetermined load. It will of course be appreciated that other forms of spring may be used, such as stacked conical washers, but a coil spring is preferred due to its ready availability.

The spring retainer plate 118 is secured by a nut 122 that is threaded to the upper end of the tie bolt 42 passing through the top fastening 46 to provide an abutment for the spring 120.

To assemble the log wall 12, logs 20 are stacked one above the other with the upper and lower faces 22, 24 abutting. Prior to installing the lower most log 20, chip deflector 53 is inserted in to the hole 40 and the bottom fastenings 44 are inserted into the counter bore 50, assuming that the holes 40 have been drilled prior to assembly of the logs 20. With the logs 20 stacked to the desired height and the top plate 36 installed, if used, the tie bolt 42 is inserted from above into the hole 40. As the tie bolt 42 approaches the bottom fastening 44, it engages end face 55 of the deflector 53 and force the fingers 57 to deflect. The fingers 57 engage the outer surface of tie bolt 42 to dislodge any chips or other debris. The convex end face 55 moves the chips to the side of the hole 40 where the clearance between the tie bolt 42 and the hole 40 provides sufficient room for the waste to accumulate. A similar wiping action occurs at the other end face 55. After the tie bolt 42 passes through the chip deflector 53, the inclined throat 64 of the lower fastening 44 guides the tie rod 42 through the inner bore 66. The end of the tie bolt 42 forces the collets 76 apart against the bias of the spring 88 and allows the tie bolt 42 to extend past the jaw assembly 74 coming to rest against the end wall 69.

The top fastening 46 is then inserted over the tie bolt 42 with the tubular body 90 facing down and into the hole 40. Again, the tie bolt 42 forces the collets 102 apart allowing the top fastening 46 to be slid down the tie bolt 42 and inserted into hole 40 with the radial flange 52 supported on the top plate 36. If the spacer 112 is separate from the flange 52, it is then slipped over the tie bolt 42 and coil spring 120 located against the radial flange 52. The spring retainer plate 118 is placed over the tie bolt 42 against the upper end of the coil spring 120 and the nut 122 threaded onto the tie bolt 42. At this time, the coil spring 120 is at its full free body length with the spring retainer plate 118 spaced from the end face 116 of the tubular spacer 112.

With each of the tie bolts 42 installed, the nuts 122 are progressively tightened in a direction compress the coil springs 120. During initial tightening, the free play between the logs 20 is taken up without significant compression of the spring 120. As logs 20 are forced against one another, the collets 102 move along the tie bolt 42 allowing relative movement between the tie bolt 42 and the upper log 20. Once the initial movement is accommodated, the tension in the tie bolt 42 increases due to the compression of the coil spring 120. The jaw assembly 74 in the bottom fastening 44 holds the tie bolt 42 and allows the coil spring 120 to be compressed. The tension in the tie bolt 42 caused by compression of the coil spring 120 applies a compressive force between the fastenings 44, 46 that forces the logs 20 into engagement with one another to compress the seals and ensure a tight fit between adjacent logs 20.

The nuts 122 continue to be tightened until the spring retainer plate 118 abuts the end face 116 of the tubular spacer 112. At this time, a defined preload is present in each of the tie bolts 42 that continuously forces the logs toward one another.

As the logs 20 continue to dry, there is a continuous downward force provided by the coil spring 120 biasing the logs 20 into engagement and minimizing the tendency for the logs 20 to "stick" and open gaps. The interaction of the collets 102 and the tie bar 42 provides a ratchet that allows relative movement in a direction that moves the logs 20 toward one another but inhibits such movement in the opposite direction. Relative movement between the tie bolt 42 and the collets 102 is accommodated in the shrinking direction of the log 20 by the collets 102 spreading and allowing the tie bolt 42 to pass. However, any attempt by the log 20 to move upwardly relative to the tie bolt 42 is opposed by the collets 102 engaging the tie bolt 42 and bearing against the conical surface 96. This prevents movement available from the partial release of the coil spring 120. Thus, once the log 20 has moved downwardly relative to the tie bolt 42 and the foundation 14, the collets 102 act as a ratchet against the tie bar 42 to prevent upward movement. At the same time, there is continuing force being applied to the tie bolt 42 that forces the logs 20 into continued engagement with one another and inhibits separation of the logs 20 to form a gap.

It will be appreciated that the nut 122 may be retightened in the event that the movement of the logs 20 is greater than the initial compression of the coil spring 120 although it is anticipated that the initial compression will typically exceed the movement experienced through shrinkage of the logs 20.

A further embodiment is shown in FIG. 7 in which like components will be identified with like reference numerals with a suffix "a" added for clarity. In the embodiment of FIG. 7, the bottom fastening 44 and top fastening 46 are reversed so that a spring 120a is located in the counter bore 50a of the bottom log 20a. The collets in fastenings 44a, 46a function in a similar manner to that described above to oppose separation of the logs with the collets in the fastening 44a allowing the tie bolt 42a to be drawn through the lower log 20a under the tension provided by the coil spring 120a. The chip collector 53a inhibits waste from entering the fastener 46a.

A further embodiment is shown in FIG. 8 in which the bottom fastening 44 is replaced with a simple nut 130 arrangement to secure the lower end of the tie bolt 42 to the log 20. In this case, a notch N is provided to allow access to the nut during initial assembly. The chip deflector 53a again prevents waste from impeding fastening of the nut to the tie bolt.

It will be seen therefore in each embodiment, the tension provided by the coil spring applied a continuing load on the logs 20 with the ratchet mechanism provided by the collets 102 inhibiting separation of the logs 20 against the bias of the coil spring 120. It will be appreciated that the chip deflector 53 may be used with a conventional tie bolt arrangement where debris and waste is found to hinder the installation of the tie bolt. Whilst the body 54 is shown with a pair of convex end faces 55, it will be appreciated that a body with a single end face may be used and that the end face may have other configurations, such as conical or planar. However, the form of body shown allows the chip deflector to be inserted in either orientation and function satisfactorily.

What is claimed is:
1. A tie bolt assembly to extend through a structure, said tie bolt assembly comprising an elongate tie bolt, and a pair of fasteners to locate said tie bolt relative to said structure at spaced locations, one of said fasteners including a biasing element acting between said tie bolt and said structure to apply tension to said tie bolt and thereby apply a corresponding compressive load to said structure, and a ratchet mechanism located in parallel to said biasing element and acting between said tie bold and said structure independently of said biasing element to permit relative movement between said structure and said tie bold in the direction of the compressive load, and to inhibit relative movement between said structure and said tie bold in a direction opposite to said compressive load.

2. A tie bolt assembly according to claim 1 wherein said biasing element acts between a first abutment on said tie bolt and a second abutment engaged with said structure.

3. A tie bolt assembly according to claim 2 wherein said first abutment loads said biasing element.

4. A tie bolt assembly according to claim 3 wherein a stop is provided to limit the load applied by said first abutment.

5. A tie bolt assembly according to claim 4 wherein said first abutment is adjustable on said tie bolt.

6. A tie bolt assembly according to claim 5 where said biasing element is a compression spring acting between said abutments.

7. A tie bolt assembly according to claim 6 where said tie bolt has a thread on its outer surface and said first abutment is a nut engaged with said thread and rotatable to load said compression spring.

8. A tie bolt assembly according to claim 7 wherein said stop is a sleeve encompassing said tie bolt between said abutments.

9. A tie bolt assembly according to claim 8 wherein said compression is a coil spring and extends about said sleeve.

10. A tie bolt assembly according to claim 1 wherein said ratchet mechanism includes a pair of collets that are radially expandable to permit said tie bolt to pass.

11. A tie bolt assembly according to claim 10 wherein said collets are biased to engage said tie bolt.

12. A tie bolt assembly according to claim 11 wherein said collets are biased to engage an inclined face and thereby into engagement with said tie bolt.

13. A tie bolt assembly according to claim 12 wherein said inclined face is formed in a chamber housing said collets and through which said tie bolt passes.

14. A tie bolt assembly according to claim 13 wherein said biasing element acts between a first abutment on said tie bolt and a secured abutment engaged with said structure.

15. A tie bolt assembly according to claim 14 wherein said chamber is formed in said second abutment.

16. A tie bolt assembly according to claim 15 wherein said second abutment has a flange for engagement with said biasing element and said structure and a tubular body projecting from said flange, said chamber being formed in said tubular body.

17. A tie bolt assembly according to claim 13 wherein said collets are axially displaceable within said chamber and are biased toward said inclined face by a spring acting in said chamber.

18. A tie bolt assembly according to claim 1 wherein the other of said fasteners includes a said ratchet mechanism to permit connection of said tie bolt to said other fastener by relative movement in one direction and inhibit separation upon a load being applied in an opposite direction.

19. A tie bolt assembly according claim 18 wherein said ratchet mechanism of said other fastener includes a pair of collets operable to engage said tie bolt.

20. A tie bolt assembly according to claim 19 including a chip deflector for mounting on said tie bolt.

21. A wall structure formed from a plurality of structural elements arranged in *seriatim* and a tie bolt assembly extending between spaced locations on said wall structure to maintain the structural integrity of said wall structure, said tie bolt assembly including an elongate tie bolt and a pair of fasteners to locate said tie bolt relative to said structural elements at respective areas of said locations, a resilient biasing element acting between said tie bolt and said wall structure to tension said tie bolt and apply a compressive load to said structural elements between said fasteners, and a ratchet mechanism located in parallel to said resilient biasing element and acting between said tie bolt and said structural elements to independently of said resilient biasing element to permit relative movement between said structural elements and said tie bolt in the direction of the compressive load, and to inhibit relative movement there between in a direction opposite to said compressive load.

22. A wall structure according to claim 21 wherein said tie bolt is located within a hole passing through said structural elements.

23. A wall structure according to claim 22 wherein said structural elements are logs arranged side by side to define said wall structure and said tie bolt extends transverse thereto to force adjacent sides into abutment.

24. A wall structure according to claim 23 wherein said fasteners engage oppositely directed sides of respective ones of said logs.

25. A wall structure according to claim 24 wherein said ratchet mechanism is incorporated in one of said fasteners.

26. A wall structure according to claim 25 wherein said one fastener includes a tubular body located within said hole and a flange extending radially from said tubular body to engage a side of said log, said body having a chamber through which said the bolt passes and in which said ratchet mechanism is located.

27. A wall structure according to claim 26 wherein said ratchet mechanism includes a plurality of collets that are radially expandable to permit said tie bolt to pass.

28. A wall structure according to claim 27 wherein said collets are biased in to engagement with said tie bolt.

29. A wall structure according to claim 28 wherein said collets are biased in to engagement with an inclined face in said chamber to and thereby into engagement with said tie bolt.

30. A wall structure according to claim 26 wherein said resilient biasing element acts between said flange and an abutment located on said tie bolt.

31. A wall structure according to claim 30 wherein said abutment is adjustable on said tie bolt.

32. A wall structure according to claim 31 wherein a stop limits movement of said abutment relative to said flange.

33. A wall structure according to claim 32 wherein said resilient biasing element is a compression spring and said stop is a sleeve encompassing said tie bolt.

34. A wall structure according to claim 33 wherein said compression spring is a coil spring and extends about said sleeve.

35. A wall structure according to claim 23 wherein a chip deflector is located in said hole to remove debris from said tie bolt as it is inserted in said hole for assembly with said fasteners.

36. A wall structure according to claim 35 wherein said tie bolt passes through said chip deflector.

37. A wall structure according to claim 36 wherein said chip deflector includes a plurality of fingers to engage an exterior surface of said tie bolt as it is inserted in said hole.

38. A wall structure according to claim 37 wherein said chip deflector includes a convex end face.

39. A wall structure according to claim 38 wherein said fingers are formed on said convex face.

40. A wall structure according to claim 35 wherein said chip deflector is positioned in said hole adjacent to one of said fasteners to inhibit debris from entering said one fastener.

41. A fastener for securing a tie bolt to a structure, said fastener having a body, a bore extending through said body to permit a tie bold to extend through said body, a radial flange on said body to provide a first abutment surface, a second abutment surface spaced from said first abutment surface for connection to a tie bolt, a ratchet mechanism in said body, said ratchet mechanism having an engagement face directed radially inwardly in to said bore to engage a tie bolt and permit unidirectional movement of said tie bolt relative to said body and a resilient biasing element extending between said abutment surfaces to act between said body and said tie bolt independently of said ratchet mechanism in a direction to induce said unidirectional movement, said ratchet mechanism being operative to inhibit relative movement between said body and said tie bar in a direction opposite said unidirectional movement.

42. A fastener according to claim 40 wherein said body includes a chamber and said chamber accommodating said ratchet mechanism.

43. A fastener according to claim 42 wherein said resilient biasing element is a coil spring.

44. A fastener according to claim 43 including a stop to limit compression of said coil spring.

45. A fastener according to claim 44 wherein said stop is a sleeve.

46. A fastener according to claim 42 wherein said ratchet mechanism includes a plurality of collets radially moveable to permit said tie bolt to pass.

47. A fastener according to claim 46 wherein said collets are axially displaceable in said chamber and are biased toward an inclined face to move said collets into engagement with said tie bolt.

48. A fastener according to claim 46 wherein said collets have an inwardly directed surface having formations therein complementary to formations in said tie bolt.

49. A fastener according to claim 48 wherein said body is dimensioned to be located within a hole formed in said structure.

50. A method of maintaining the structural integrity of a structure comprising the steps of attaching a tie bolt assembly between spaced locations on said structure, by locating a first fastener at on end of a hole in said structure, inserting said tie bolt in to said hole, securing said tie bolt to said first fastener, locating a body including ratchet mechanism on said tie bolt, locating a resilient biasing element on said body in parallel to said ratchet mechanism to act on said structural elements independently of said ratchet mechanism, attaching a second fastener to said tie bolt at an opposite end of said hole to act on said resilient biasing element and apply a resilient load to said tie bolt and thereby a compressive load between said spaced locations, said ratchet mechanism being orientated in said body to inhibit relative movement between said tie bolt and said structure in a direction opposite to said compressive load 51. A method according to claim 50 including the step of adjusting said resilient biasing element to apply a predetermined load to said tie bolt.

52. A method according to claim 50 wherein the step of inserting a chip deflector in said hole prior to inserting said tie bolt through said hole.

53. A wall structure having a plurality of structural elements placed side by side, a tie bolt extending through a hole in said structural elements between a pair of fasteners and a chip deflector located in said hole to remove debris from a surface of said tie bolt as it is inserted in said hole.

54. A wall structure according to claim 53 wherein said tie bolt passes through said chip deflector.

55. A wall structure according to claim 53 wherein said chip deflector includes a plurality of fingers to engage said surface of said tie bolt.

56. A wall structure according to claim 55 wherein said fingers are formed on an end face of said deflector.

57. A wall structure according to claim 56 wherein said end face is convex.

58. A walls structure according to claim 53 wherein said chip deflector has a body in engagement with said hole to provide a barrier in said hole and said tie bolt passes through said body.

* * * * *